J. WEBER.
FRUIT CUTTER.
APPLICATION FILED MAY 4, 1914. RENEWED JUNE 23, 1915.
1,168,838. Patented Jan. 18, 1916.
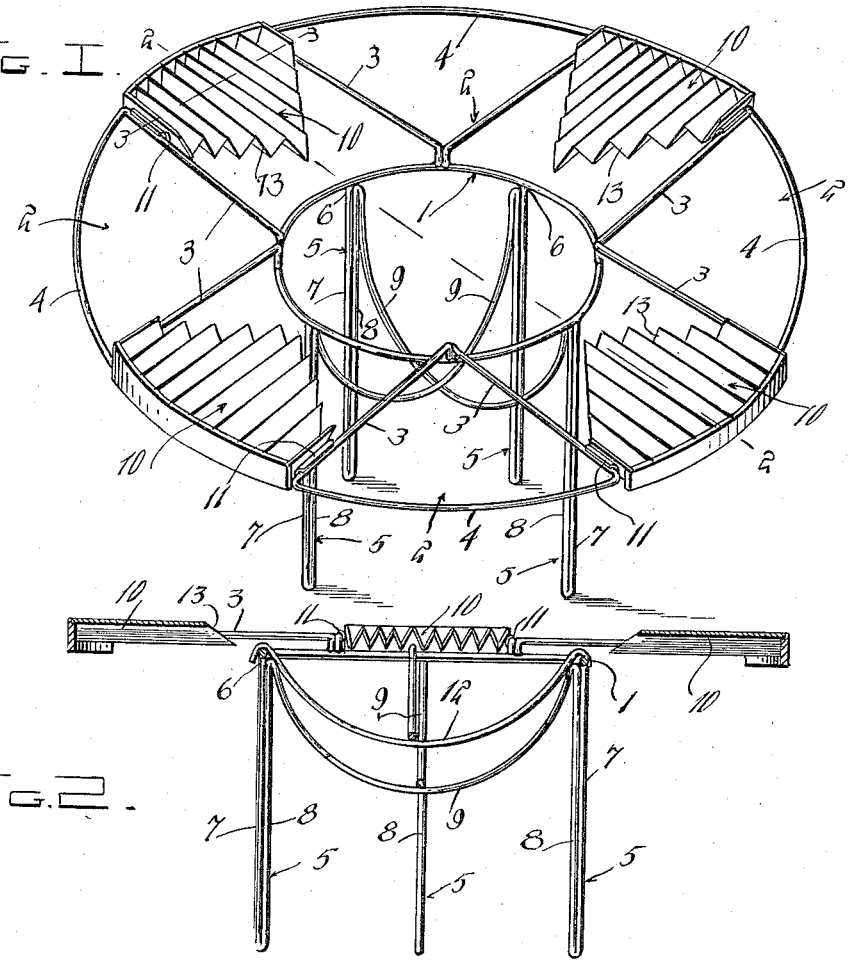
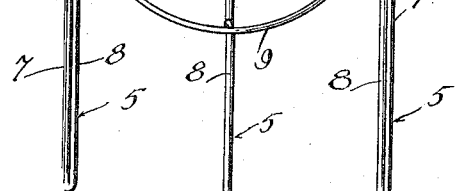
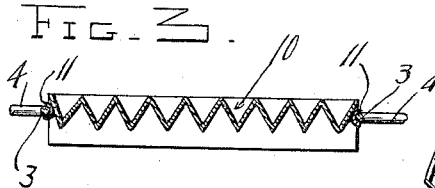
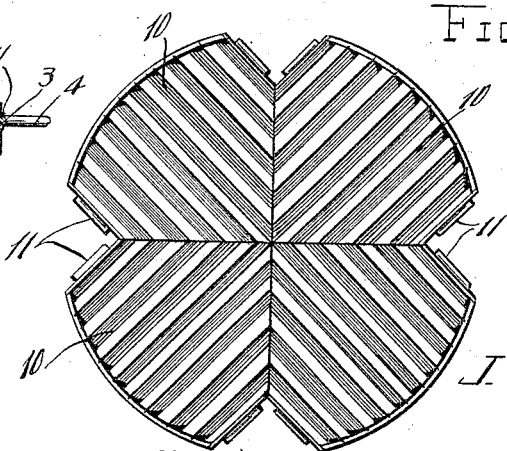
Inventor
J. Weber

UNITED STATES PATENT OFFICE.

JULIA WEBER, OF NEW YORK, N. Y.

FRUIT-CUTTER.

1,168,838.      Specification of Letters Patent.      Patented Jan. 18, 1916.

Application filed May 4, 1914, Serial No. 836,343. Renewed June 23, 1915. Serial No. 35,941.

*To all whom it may concern:*

Be it known that I, JULIA WEBER, a citizen of the United States, residing at New York, in the county of New York, State of New York, have invented certain new and useful Improvements in Fruit-Cutters; and I do hereby declare the following to be a full, clear, and exact description of the invention, such as will enable others skilled in the art to which it appertains to make and use the same.

The present invention is directed to improvements in fruit cutters, and more particularly for a cutter designed for cutting grape fruit or the like in equal halves.

The invention has for its object to so construct a device that fruit can be easily and quickly cut in equal halves upon manually operating a plurality of blades toward each other.

A still further object of the invention is to provide a novel form of frame for slidably supporting the cutting blades.

A still further object of the invention is to so construct a device of this character that fruits of different sizes can be readily cut in half.

With these and other objects in view, this invention resides in the novel features of construction, formation, combination and arrangement of parts to be hereinafter more fully described, claimed and illustrated in the accompanying drawing, in which:—

Figure 1 is a perspective view of the device. Fig. 2 is a transverse sectional view through the device, showing a detachable basket applied thereto. Fig. 3 is a sectional view on line 3—3 of Fig. 1. Fig. 4 is a top plan view of the knives, showing the same in their positions after cutting the fruit.

Referring to the drawing, the numeral 1 designates a ring, the same being formed from stout wire. Formed on this ring 1 are guide frames 2, which consist of convergingly arranged side bars 3, and a curved connecting or brace bar 4, said frames being so arranged that the side bars 3 are disposed in parallel relation to the side bars of the adjacent frame.

To support the ring 1 and frames 2, legs 5 are provided, said legs being also formed from stout wire and are connected to the ring 1 as at 6, said legs being formed from inner and outer strands 7 and 8, the inner strands terminating in downwardly curved bars 9 which are disposed in intersecting relation at their centers so as to support the fruit when resting upon said bars, said fruit being prevented from rolling from engagement with the bars by the ring 1.

The cutting blades 10 are substantially triangular in shape and have their side edges provided with guides 11 for slidably engaging the bars 3 of the frames 2, said bars being disposed slightly above the plane of the ring 1 so that when the knives are moved inwardly they can slide upon the ring 1 for engagement with the fruit.

To facilitate cutting of the fruit the blades are fluted in cross section, as clearly shown in Fig. 3 of the drawing.

When it is desired to cut fruit smaller than grape fruit the frame 12 is employed and is detachably connected to the ring 1 as shown in Fig. 2 of the drawing.

In use the fruit is placed upon the bars 9 so that its major diameter will be substantially on the plane of the ring 1, whereupon the cutting blades are forced toward each other, each pair successively until the beveled edges 13 of the blades contact, thereby cutting the fruit in substantially equal halves.

What is claimed is:—

1. In a fruit cutter comprising a ring for encircling the fruit, frames supported by the ring, and cutting blades slidably supported by the frames for movement toward each other for cutting the fruit.

2. A fruit cutter comprising a ring, legs for supporting the ring, downwardly curved bars supported by the legs and having their centers intersecting for supporting the fruit when inclosed by the ring, frames supported by the ring, each frame having its side bar disposed in parallel relation with the side bar of the adjacent frame, cutting blades having guides connected to their sides for slidably engaging said bars, as and for the purpose set forth.

In testimony whereof, I affix my signature, in the presence of two witnesses.

JULIA WEBER.

Witnesses:
CHAS. F. COLE,
C. V. HUBBS.

Copies of this patent may be obtained for five cents each, by addressing the "Commissioner of Patents, Washington, D. C."